United States Patent
Meng et al.

(10) Patent No.: US 12,487,490 B2
(45) Date of Patent: Dec. 2, 2025

(54) BACKLIGHT MODULE AND DISPLAY DEVICE

(71) Applicant: BOE Technology Group Co., Ltd., Beijing (CN)

(72) Inventors: Xianqin Meng, Beijing (CN); Yan Qu, Beijing (CN); Weiting Peng, Beijing (CN); Wei He, Beijing (CN); Wei Wang, Beijing (CN); Chunfang Zhang, Beijing (CN); Qiuyu Ling, Beijing (CN); Pengxia Liang, Beijing (CN); Xiaochuan Chen, Beijing (CN); Xue Dong, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/783,567

(22) Filed: Jul. 25, 2024

(65) Prior Publication Data
US 2024/0385480 A1 Nov. 21, 2024

Related U.S. Application Data

(63) Continuation of application No. PCT/CN2022/108029, filed on Jul. 26, 2022.

(51) Int. Cl.
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133605* (2013.01)

(58) Field of Classification Search
CPC ......... G02F 1/133614; G02F 1/133603; G02F 1/133605; G02F 1/133612
See application file for complete search history.

(56) References Cited

U.S. PATENT DOCUMENTS

2006/0146530 A1 7/2006 Park et al.
2022/0228722 A1 7/2022 Nishikawa et al.
(Continued)

FOREIGN PATENT DOCUMENTS

| CN | 111505868 A | 8/2020 |
| CN | 111722433 A | 9/2020 |

(Continued)

OTHER PUBLICATIONS

International Search Report and Written Opinion mailed on Oct. 28, 2022, in corresponding PCT/CN2022/108029, 14 pages.

*Primary Examiner* — Tracie Y Green
(74) *Attorney, Agent, or Firm* — XSENSUS LLP

(57) ABSTRACT

A backlight module, including a light-emitting unit, emergent light of which passes through a packaging layer and then is transmitted to a surface of a first reflective layer, then passes through the surface of the first reflective layer and passes through the packaging layer again, enters a light-transmitting substrate from the packaging layer, and is emitted from the side of the light-transmitting substrate distant from the light-emitting unit. The thicknesses of the packaging layer and the light-transmitting substrate are effectively utilized to increase an optical path, thereby reducing the thickness of the backlight module. The first reflective layer is Lambertian. The side of the first reflective layer near the light-transmitting substrate and the side distant from the light-transmitting substrate allow the emergent light transmitted to the surface thereof to be scattered and homogenized to increase the optical path again, and can also function as diffusor plates.

15 Claims, 9 Drawing Sheets

(56) References Cited

U.S. PATENT DOCUMENTS

| | | | | |
|---|---|---|---|---|
| 2023/0106169 A1* | 4/2023 | Peng | .................... | H10D 86/441 |
| | | | | 257/91 |
| 2024/0295786 A1* | 9/2024 | Meng | ................ | G02F 1/133536 |

FOREIGN PATENT DOCUMENTS

| CN | 112259571 A | 1/2021 |
|---|---|---|
| CN | 113867040 A | 12/2021 |
| TW | 202036058 A | 10/2020 |
| WO | 2021/248375 A1 | 12/2021 |
| WO | 2022/140886 A1 | 7/2022 |

\* cited by examiner

BACKLIGHT MODULE AND DISPLAY DEVICE

CROSS-REFERENCE TO RELATED APPLICATION

The present application is a continuation application of International Application No. PCT/CN2022/108029, filed on Jul. 26, 2022, the content of which is incorporated by reference herein in its entirety.

TECHNICAL FIELD

The present disclosure relates to the field of display technology, and in particular to a backlight module and a display device.

BACKGROUND

With the continuous development of liquid crystal display technology, large-size and ultra-thin display devices are becoming more and more popular among users. As display devices are moving towards thinness, the requirements for the thickness of the backlight module are getting higher and higher.

It should be noted that the information disclosed in the above background section is only used to enhance the understanding of the background of the present disclosure, and therefore may include information that does not constitute prior art known to those skilled in the art.

SUMMARY

The present disclosure provides a backlight module and a display device.

According to an aspect of the present disclosure, there is provided a backlight module, including a light-emitting substrate, an encapsulation layer and a first reflective layer. The light-emitting substrate includes a transparent substrate and a plurality of light-emitting units, and the plurality of light-emitting units are arranged in an array on a side of the transparent substrate. The encapsulation layer is disposed on a side of the plurality of light-emitting units away from the transparent substrate, and an orthographic projection of the encapsulation layer on the transparent substrate at least covers an orthographic projection of the plurality of light-emitting units on the transparent substrate. The first reflective layer is disposed on a side of the encapsulation layer away from the transparent substrate, and an orthographic projection of the first reflective layer on the transparent substrate at least covers the orthographic projection of the plurality of light-emitting units on the transparent substrate, and the first reflective layer is a Lambertian body.

According to another aspect of the present disclosure, there is provided a display device, including the backlight module according to any one of the above items.

It is to be understood that the foregoing general description and the following detailed description are exemplary and explanatory only and are not restrictive of the present disclosure.

BRIEF DESCRIPTION OF THE DRAWINGS

The drawings herein are incorporated into the specification and constitute a part of the specification, showing embodiments consistent with the present disclosure, and are used together with the specification to explain the principles of the present disclosure. Obviously, the drawings described below are only some embodiments of the present disclosure. For those skilled in the art, other drawings can also be obtained based on these drawings without creative work.

Figure 1:
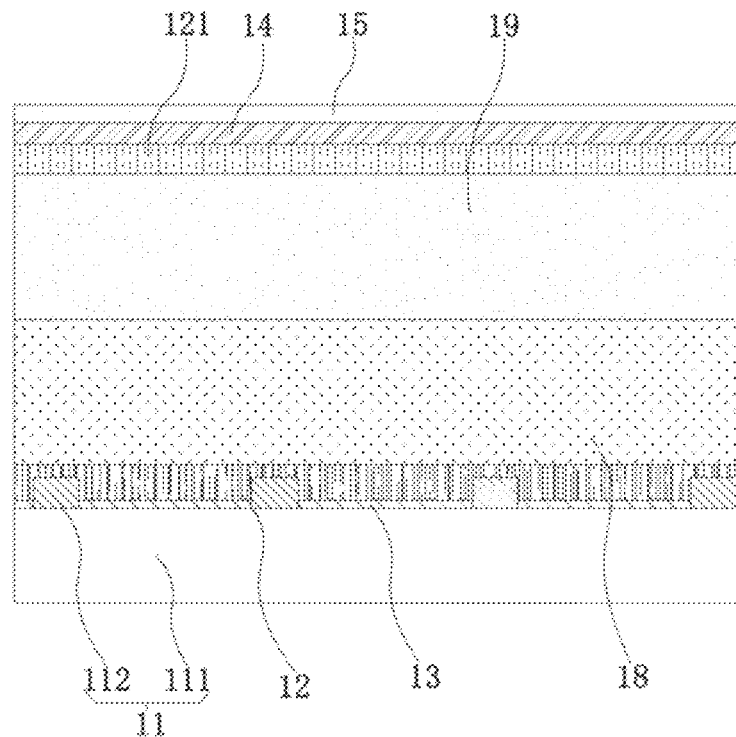
FIG. 1 is a structural schematic diagram of a backlight module involved in the related art.

In the figure: 1—backlight module, 10—light guide plate, 11—light-emitting substrate, 110—driving wiring, 111—transparent substrate, 112—light-emitting unit, 1121—lamp bead, 1122—protective adhesive, 113—first conductive layer, 1131—first wiring, 114—first insulating layer, 1141—second opening, 115—second conductive layer, 1151—second wiring, 116—second insulating layer, 1161—third opening, 117—second reflective layer, 118—third reflective layer, 119—first protective layer; 12—encapsulation layer, 121—color conversion layer, 1211—color conversion particle, 122—first barrier layer, 123—second barrier layer, 124—sub-part, 13—first reflective layer, 131—first reflective portion, 14—polarizing layer, 15—diffusion layer, 16—first buffer layer, 17—adhesive layer, 18—air gap, 19—diffusor plate; 2—display panel, 21—substrate, 22—driving circuit layer, 222—active layer, 223—gate insulating layer, 224—gate layer, 225—interlayer dielectric layer, 226—source-drain metal layer, 227—planarization layer, 23—pixel layer, 231—common electrode, 232—second protective layer, 233—pixel electrode, 234—liquid crystal layer, 235—color filter layer, 236—insulating layer, 24—second buffer layer, 3—back plate, 31—bottom plate, 32—side plate, 4—frame, 41—first support portion, 42—second support portion.

DETAILED DESCRIPTION

Example embodiments will now be described more fully with reference to the accompanying drawings. However, example embodiments can be implemented in a variety of forms and should not be construed as limited to the embodiments set forth herein; rather, these embodiments are provided so that the present disclosure will be comprehensive and complete and the concepts of the example embodiments will be fully conveyed to those skilled in the art. The same reference numerals in the figures represent the same or similar structures, and their detailed descriptions will be omitted. In addition, the drawings are only schematic illustrations of the present disclosure and are not necessarily drawn to scale.

Although relative terms, such as "up" and "down" are used in this specification to describe the relative relationship of one component indicated by an icon to another component, these terms are used in this specification only for convenience. For example, according to the direction of the example described in drawings, it will be understood that if the device indicated by the icon is turned upside down, the component described as being "up" would become the component being "down". When a structure is "on" another structure, it may mean that the structure is integrally formed on the other structure, or that the structure is "directly" placed on the other structure, or that the structure is "indirectly" placed on the other structure through another structure.

The terms "one", "a", "the", "said" and "at least one" are used to indicate the presence of one or more elements/components/etc.; the terms "including" and "having" are used to indicate an open-ended inclusion and mean that there may be other elements/components/etc. in addition to the listed elements/components/etc.; the terms "first", "second" and "third" are used only as markers and are not a limit on the number of their objects.

The passive display requires a light source to backlight the display. An inorganic light-emitting diode is usually used as a backlight unit (BLU). The inorganic light-emitting diode refers to a light-emitting element made of inorganic material, where LED refers to an inorganic light-emitting element that is different from OLED. Specifically, the inorganic light-emitting element may include Mini Light Emitting Diode (abbreviated as Mini LED) and Micro Light Emitting Diode (abbreviated as Micro LED). The Mini Light Emitting Diode (i.e., Mini LED) refers to a small light-emitting diode with a grain size between the Micro LED and the traditional LED. Generally, the grain size of the Mini LED can be between 100 and 300 microns.

In the related backlight module, point light sources are used as backlight sources, and it is usually necessary to provide sufficient optical path to uniformize the point light sources arranged in a dot matrix into a surface light source, resulting in a thicker thickness of the final backlight module.

In the related art, the backlight module is shown in FIG. 1. The backlight module includes a light-emitting substrate 11. The light-emitting substrate 11 includes a transparent substrate 111 and light-emitting units 112. A plurality of light-emitting units 112 are arranged in an array on one side of the transparent substrate 111. White oil is brushed between the light-emitting units 112 to form a first reflective layer 13. An encapsulation layer 12 is formed on the side of the light-emitting unit 112 and the first reflective layer 13 away from the transparent substrate 111. An air gap 18 is reserved on the side of the encapsulation layer 12 away from the transparent substrate 111. A diffusor plate 19 is formed on the side of the air gap 18 away from the transparent substrate 111. A color conversion layer is formed on the side of the diffusor plate 19 away from the transparent substrate 111. A polarizing layer 14 is formed on the side of the color conversion layer away from the transparent substrate 111. The polarizing layer 14 is prism on prism. A diffusion layer 15 is formed on the side of the polarizing layer 14 away from the transparent substrate 111.

Among them: the light-emitting units 112 arranged in an array provide outgoing light, and the light-emitting unit uses blue Mini-LED, so the outgoing light is all blue light. The air gap 18 and the diffusor plate 19 are configured to provide sufficient optical path, and the light-emitting units 112 arranged in a dot matrix are uniformly arranged into a surface light source. The color conversion layer is configured to convert blue light into white light. The prism on prism is configured to converge the light emitted at a large angle to the visual angle to increase the brightness of the visual angle. The diffusor plate is configured to increase the uniformity reduction brought by the convergence to the product requirement value again. The reflective layer is configured to reflect the reflected light of the color conversion layer 121, the diffusor plate 19 and the encapsulation layer 12 as outgoing light for reuse, in order to improve the brightness of the backlight module. The thickness of the backlight module of this structure is relatively large, which is not conducive to realizing the thinness of the display device.

Based on this, the embodiment of the present disclosure provides a backlight module. As shown in FIG. 2 to FIG. 17, the backlight module includes a light-emitting substrate 11, an encapsulation layer 12 and a first reflective layer 13. The light-emitting substrate 11 includes a transparent substrate 111 and a plurality of light-emitting units 112. The plurality of light-emitting units 112 are arranged in an array on one side of the transparent substrate 111. The encapsulation layer 12 is arranged on a side of the plurality of light-emitting units 112 away from the transparent substrate 111. The orthographic projection of the encapsulation layer 12 on the transparent substrate 111 at least covers the orthographic projection of the plurality of light-emitting units 112 on the transparent substrate 111. The first reflective layer 13 is arranged on a side of the encapsulation layer 12 away from the transparent substrate 111. The orthographic projection of the first reflective layer 13 on the transparent substrate 111 at least covers the orthographic projection of the plurality of light-emitting units 112 on the transparent substrate 111. The first reflective layer 13 is a Lambertian body.

The outgoing light of the light-emitting unit 112 passes through the encapsulation layer 12 and is transmitted to the surface of the first reflective layer 13. After being reflected by the surface of the first reflective layer 13, it passes through the encapsulation layer 12 again, enters the transparent substrate 111 from the encapsulation layer 12, and then emits light from the side of the transparent substrate 111 away from the light-emitting unit 112. The thickness of the encapsulation layer 12 and the transparent substrate 111 is effectively used to increase the optical path and reduce the thickness of the backlight module. The first reflective layer 13 is a Lambertian body. The first reflective layer 13, both on the side close to the transparent substrate 111 and the side away from the transparent substrate 111, scatter and homogenize the outgoing light transmitted to its surface, further increasing the optical path, and can also function as a diffusor plate. The backlight module omits the thickness of the air gap 18 and the diffusor plate, so the total thickness of the backlight module is greatly reduced, which is conducive to realizing the thinness of the display device.

The backlight module usually also includes a polarizing layer 14 and a diffusion layer 15. The polarizing layer 14 is arranged on the other side of the transparent substrate 111 away from the light-emitting unit 112. The diffusion layer 15 is arranged on the side of the polarizing layer 14 away from the transparent substrate 111. The polarizing layer 14 is an orthogonal prism film. Two orthogonal prism films can be integrated into one piece to meet the brightness requirement of the display device and reduce the backlight power consumption and thickness. The diffusor will make the light converged by the polarizing layer 14 uniform again to meet the backlight uniformity requirement of the display device.

It should be noted that when the incident energy is uniformly reflected in all directions, i.e., the incident energy is centered at the incident point, the phenomenon of isotropically reflecting energy in all directions throughout the hemispherical space is called diffuse reflection, also known as isotropic reflection. A fully diffusion body is called a Lambertian body. The light incident on the surface of the first reflective layer 13 can be reflected back to the encapsulation layer 12, the transparent substrate 111, the polarizing layer 14 and the diffusion layer 15 in a manner close to Lambertian scattering.

Figure 2:
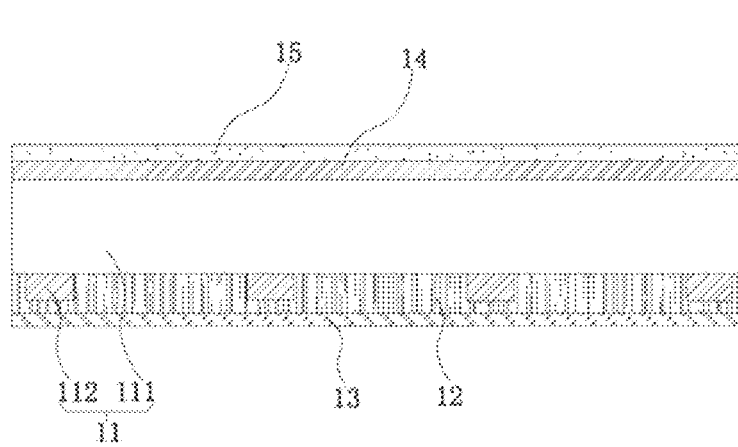
FIG. 2 is a structural schematic diagram of a backlight module involved in an embodiment of the present disclosure.

As shown in FIG. 2, a plurality of light-emitting units 112 are arranged in an array on one side of the transparent substrate 111. The light-emitting unit 112 may be a mini-LED. The light emission of the mini-LED is a kind of near-Lambertian light emission, and the light-emitting beam angle thereof is distributed within the range of ±90°. The light intensity of the MLED chip is shown in Formula 1:

$$I_i = I_0 \cos\theta \tag{1}$$

Figure 3:
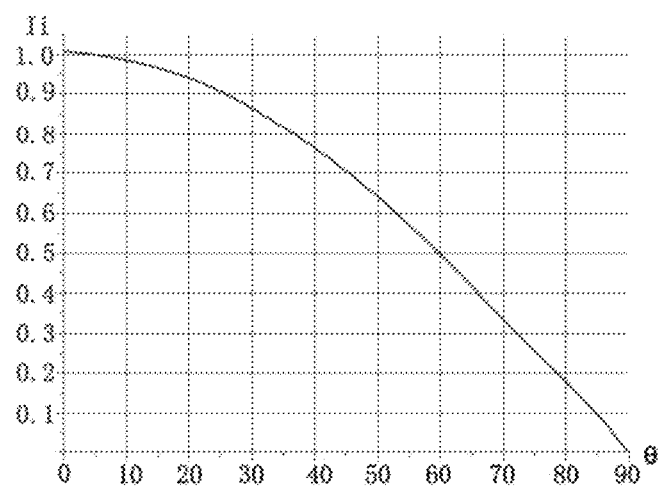
FIG. 3 is a light intensity distribution diagram of a light-emitting unit involved in an embodiment of the present disclosure at different angles.

That is, the light intensity also presents a cosine distribution with the change of the angle of light emission. Based on this, the distribution of light intensity at different angles is shown in FIG. 3. It can be found that the light intensity of the mini-LED is mainly concentrated in a small angle range. The larger the emission angle, the weaker the light intensity.

Figure 4:
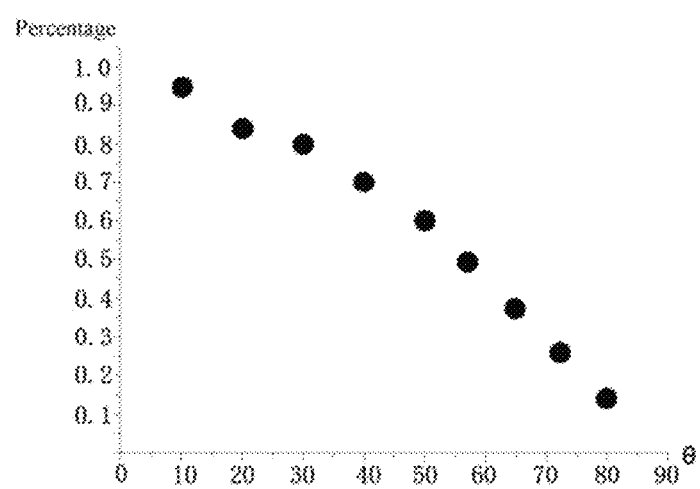
FIG. 4 is a schematic diagram of a light intensity percentage distribution of a light-emitting unit involved in an embodiment of the present disclosure at different angles.

As shown in FIG. 4, when the angle of the incident light is less than 20°, nearly 35% of the LED light emission is concentrated in this range. When the angle of the incident light is greater than 80°, only 1.7% of the light is distributed in this area. If it is to be used as a light source for the light-emitting substrate 11, it is hoped that the light intensity of the light-emitting unit 112 is uniformly distributed within the range of 0-90°. Therefore, the central light intensity of the light-emitting unit 112 is set to be lowered, and the edge light intensity is increased to achieve a bat-shaped light distribution pattern. While improving the luminous uniformity of the light-emitting substrate 11, the pitch between adjacent light-emitting units 112 can be increased.

Figure 5:
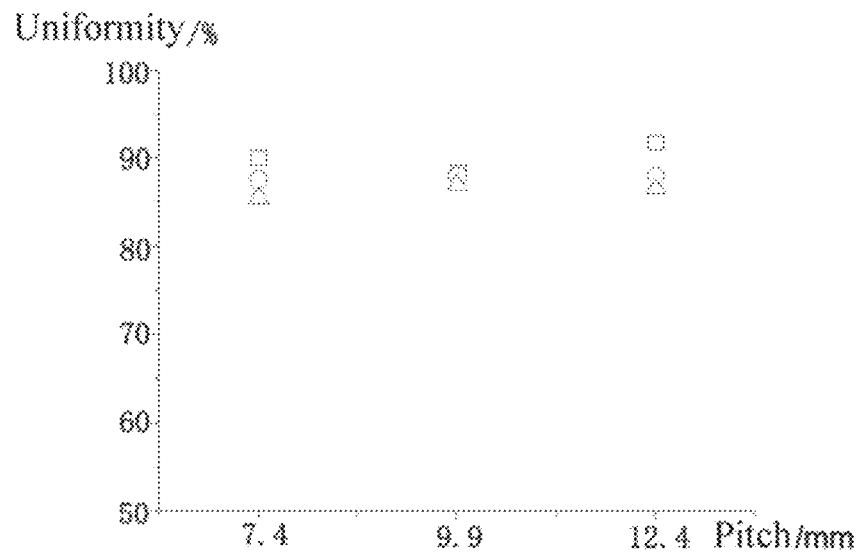
FIG. 5 is a schematic diagram of the relationship between the size of a light-emitting unit involved in an embodiment of the present disclosure and the backlight uniformity.
Figure 6:
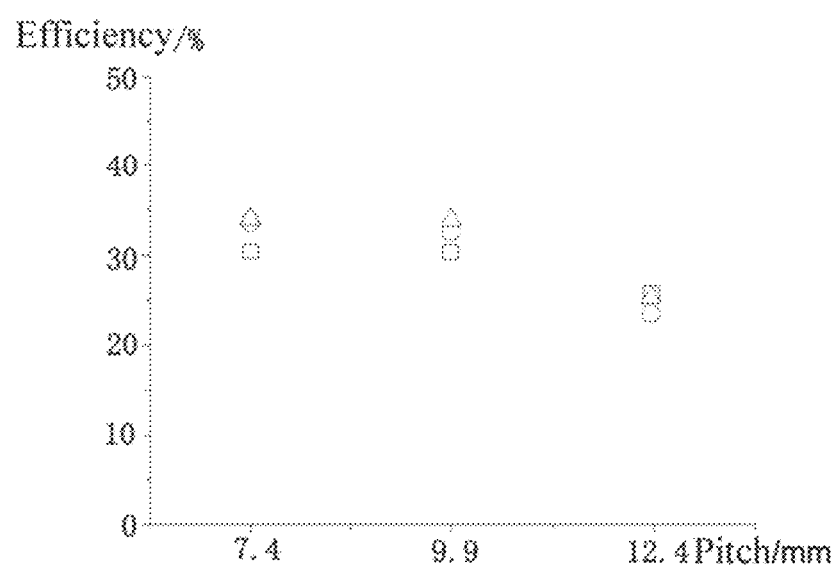
FIG. 6 is a schematic diagram of the relationship between the size of a light-emitting unit involved in an embodiment of the present disclosure and the light efficiency.

As shown in FIG. 5 and FIG. 6, the effect of the size of the light-emitting unit 112 on the backlight efficiency and uniformity is analyzed. Three commonly used mini-LED sizes are selected, and the effect of mini-LEDs of different sizes on the final light efficiency and uniformity of the light-emitting substrate 11 with different pitches is calculated. The triangle represents the smallest specification of mini-LED, such as: 05 mil×09 mil, the circle represents the medium specification of mini-LED, such as: 08 mil×08 mil, and the square represents the largest specification of mini-LED, such as: 12 mil×12 mil. It can be seen from FIG. 5 and FIG. 6 that when the horizontal and vertical dimensions of the mini-LED are 2 times, the light efficiency will be slightly improved, but the uniformity will decrease with the increase of the size. This is mainly attributed to the hot spots generated by the light emission, and the hot spots lead to a decrease in the uniformity of the backlight. Therefore, the size of the mini-LED has no obvious effect on the uniformity and light efficiency.

In summary, the light uniformity can be improved by controlling the light distribution pattern of mini-LED. However, the larger the size of mini-LED, the worse the light uniformity. In addition, the effect of the size of mini-LED on the light efficiency is not very obvious. Specifically, the mini-LED can be a blue-light mini-LED, and the size of the mini-LED is 0.5 mil×0.9 mil.

Figure 7:
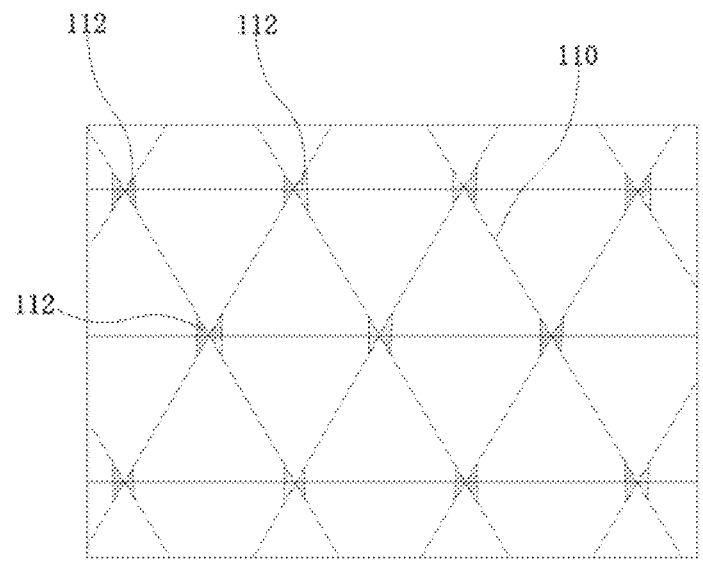
FIG. 7 is a schematic diagram of the distribution of multiple light-emitting units involved in an embodiment of the present disclosure.

As shown in FIG. 7, a plurality of light-emitting units 112 are arranged into a plurality of interlaced equilateral triangle light-emitting groups. Each equilateral triangle light-emitting group includes three light-emitting units 112, and the three light-emitting units 112 are respectively arranged at the three vertices of the equilateral triangle light-emitting group. Two adjacent equilateral triangle light-emitting groups share two light-emitting units 112. The light-emitting units 112 are arranged in an equilateral triangle, which can reduce the number of light-emitting units 112, and the distance between two adjacent light-emitting units 112 is 4.75 mm.

The backlight module also includes driving lines 110, which can be electrically connected to the first electrode and the second electrode of each light-emitting unit 112, and are configured to provide an electrical signal to each light-emitting unit 112. In order to prevent the driving lines 110 from short-circuiting with the first electrode and the second electrode and reduce the parasitic capacitance, an insulating layer is configured for filling.

Because the light-emitting substrate 11 emits light to the side away from the transparent substrate 111, all the emitted light will pass through the driving line 110 of the light-emitting unit 112, so the opening ratio of the driving line 110 is expected to be as large as possible. The conductivity must meet the electrical requirements while its reflectivity must also meet the optical requirements. The driving line 110 is defined as the reflective part, and the insulating layer between the driving lines 110 is defined as the transparent part. The area of the orthographic projection of the transparent part on the transparent substrate 111 accounts for more than 87% of the orthographic projection of the first driving layer group on the transparent substrate 111.

Figure 8:
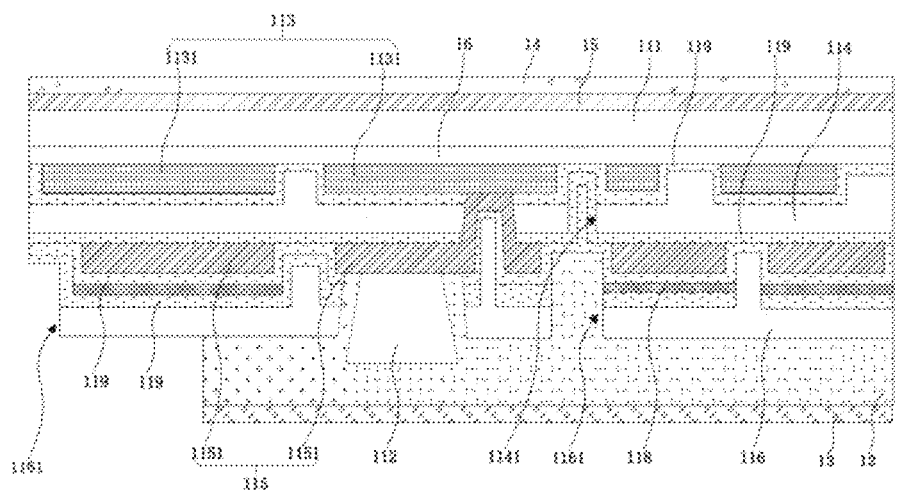
FIG. 8 is another structural schematic diagram of a backlight module involved in an embodiment of the present disclosure.

As shown in FIG. 8, the driving lines and the insulating layer between the driving lines constitute the first driving layer group. A first buffer layer 16 is provided between the first driving layer group and the transparent substrate 111.

The first driving layer group and the light-emitting unit 112 are provided on the same side of the transparent substrate 111. The driving line includes a first conductive layer 113 and a second conductive layer 115, and the insulating layer includes a first insulating layer 114 and a second insulating layer 116. The first conductive layer 113 and the light-emitting unit 112 are arranged on the same side of the transparent substrate 111, and the first conductive layer 113 includes a plurality of first wirings. The first insulating layer 114 is arranged on a side of the first conductive layer 113 away from the transparent substrate 111 and located between two adjacent first wirings. A first opening that exposes the first conductive layer 113 is provided on the first insulating layer 114. The second conductive layer 115 is arranged on a side of the first insulating layer 114 away from the transparent substrate 111, and the second conductive layer 115 includes a plurality of second wirings 1151, and the second wirings 1151 pass through the first opening and are connected to the first wirings and are connected to the light-emitting unit 112. The second insulating layer 116 is arranged on a side of the second conductive layer 115 away from the transparent substrate 111 and located between two adjacent second wirings 1151.

The first wiring and the second wiring 1151 form a reflective part. The portion of the first insulating layer 114 located between the first wirings and the portion of the second insulating layer 116 located between the second wirings 1151 constitute the reflective part. The backlight module includes multiple light-emitting areas. In different light-emitting areas, the pitch differs between two adjacent first wirings, and the pitch differs between two adjacent second wirings 1151. The proportion of the reflective part in different light-emitting areas can be controlled by controlling the distribution density of the first wirings and the second wirings 1151, so as to adjust the luminous flux of the outgoing light of the backlight module and achieve the purpose of uniform light emission.

In order to enhance the reflection effect of the reflective part, the first driving layer group can also include a third reflective layer 118. The third reflective layer 118 is arranged between the transparent substrate 111 and the first conductive layer 113. The orthographic projection of the third reflective layer 118 on the transparent substrate 111 covers the orthographic projection of the first wiring on the transparent substrate 111. The orthographic projection of the third reflective layer 118 on the transparent substrate 111 covers the orthographic projection of the second wiring 1151 on the transparent substrate 111.

In addition, a first protective layer 119 is provided between the first conductive layer 113 and the first insulating layer 114, between the first insulating layer 114 and the second conductive layer 115, between the second conductive layer 115 and the third reflective layer 118, and between the third reflective layer 118 and the second insulating layer 116.

Figure 9:
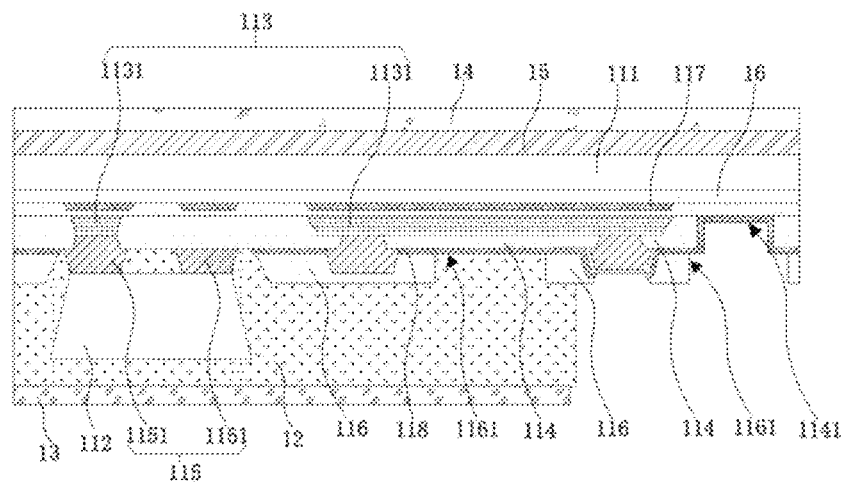
FIG. 9 is yet another structural schematic diagram of a backlight module involved in an embodiment of the present disclosure.

As shown in FIG. 9, on the basis of FIG. 8, the first driving layer group may further include a second reflective layer 117. The second reflective layer 117 is provided between the second conductive layer 115 and the second insulating layer 116. The orthographic projection of the second reflective layer 117 on the transparent substrate 111 overlaps at least partially with the orthographic projection of the first wiring on the transparent substrate 111, and the orthographic projection of the second reflective layer 117 on the transparent substrate 111 overlaps at least partially with the orthographic projection of the second wiring 1151 on the transparent substrate 111.

It should be noted that the material of the first wiring and the second wiring 1151 is copper, and the material of the second reflective layer 117 and the third reflective layer 118 is silver. The reflective layer can improve the reflectivity of the reflective part. In order to prevent the reflective layer from being oxidized, a thin ITO layer can be covered on the surface of the reflective layer. The ITO layer ensures the anti-oxidation performance of the reflective part and can ensure its reflectivity. The reflective layer can specifically include 8 nm ITO, 100 nm Ag, 1 um Cu, 100 nm Ag and 8 nm ITO arranged in sequence in the direction away from the transparent substrate 111. In other embodiments, the first wiring and second wiring 1151 can also use CuNi.

Referring again to FIG. 8 and FIG. 9, in order to improve the transmittance, reduce the power consumption of the backlight module, and reduce the influence of the first insulating layer 114 and the second insulating layer 116 on the color coordinates and color deviation, the first insulating layer 114 and the second insulating layer 116 can use a high-transmittance adhesive material. Specifically, the first insulating layer and the second insulating layer are both optical adhesives, and the transmittance of the optical adhesive to the outgoing light of the light-emitting unit is greater than 95%. In this embodiment, the emitted light of the mini-LED is blue light, and the wavelength of the blue light is 400 nm-450 nm. When the optical adhesive is 2 mm thick, the transmittance of the light with a wavelength of 450 nm is greater than 99%.

The first insulating layer 114 and the second insulating layer 116 can also be hollowed out. Specifically, the first opening 1141 can be provided in the portion of the first insulating layer 114 between two adjacent first wirings, or the second opening 1161 can be provided in the portion of the second insulating layer 116 between two adjacent second wirings 1151. The first opening 1141 can also be provided in the portion of the first insulating layer 114 between two adjacent first wirings, and the second opening 1161 can be provided in the portion of the second insulating layer 116 between two adjacent second wirings 1151.

Figure 10:
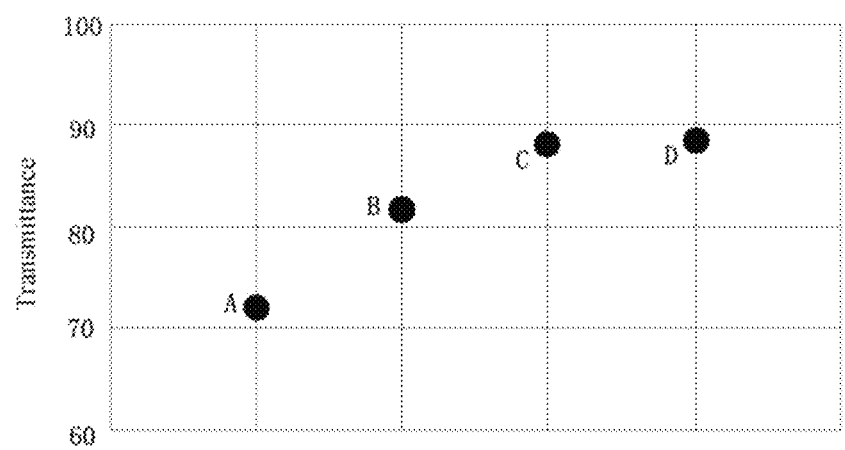
FIG. 10 is a schematic diagram of the transmittance of different backlight modules involved in an embodiment of the present disclosure.

As shown in FIG. 10, point A is the transmittance of the backlight module when the first insulating layer 114 and the second insulating layer 116 use the adhesive in the related art; point B is the transmittance of the backlight module when the first insulating layer 114 and the second insulating layer 116 use the adhesive with high transmittance; point C is the transmittance of the backlight module when the second opening 1161 is provided in the second insulating layer 116 in the present disclosure; point D is the transmittance of the backlight module when the first opening 1141 is provided in the first insulating layer 114 and the second opening 1161 is provided in the second insulating layer 116 in the present disclosure. It can be seen that when the first insulating layer 114 and the second insulating layer 116 use the adhesive with high transmittance, the transmittance of the backlight module can be increased from 72% to 82%. When the second insulating layer 116 is provided with a second opening 1161, the transmittance of the backlight module can be increased to 88.0%. When the first opening 1141 is provided in the first insulating layer 114 and the second opening 1161 is provided in the second insulating layer 116, the transmittance of the backlight module can be increased to 88.3%.

Figure 11:
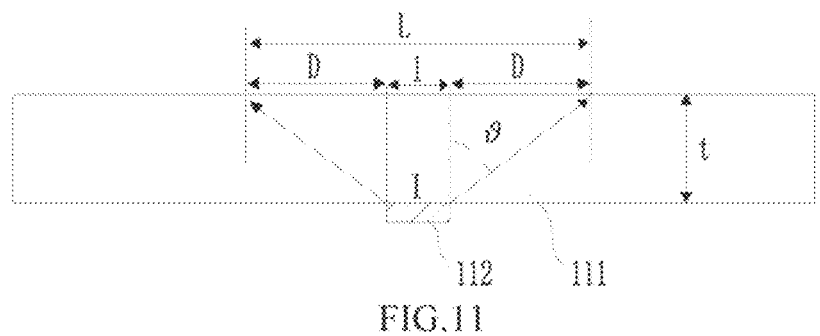
FIG. 11 is a schematic diagram of the principle of the expandable range of a light-emitting unit involved in an embodiment of the present disclosure.

In addition, how to extract the light from the mini-LED as much as possible is also the core of reducing power consumption and improving brightness. As shown in FIG. 11, the model is simplified, and the uniformity of the MLED backlight is temporarily not considered. Only the mini-LED emits light through the medium to the air. After passing through an optical medium with a thickness of mm, the width or diameter of the area that the mini-LED can radiate is:

$$L = 2*D + l = 2*t*\tan\vartheta + l \qquad (2)$$

wherein, L is the spot diameter, D is the distance that the light energy escapes from the waveguide, l is the size of the mini-LED, $\vartheta$ is the light output angle, and t is the distance that the emitted light passes through.

The radiation range of mini-LED is from positive 90° to negative 90°. The transmission medium is glass with a refractive index of n=1.52 and a thickness of 0.7 mm. If the light-emitting unit 112 uses a mini-LED with a size of 100 microns, the outgoing light is coupled from the glass to the air, and $\vartheta c < \arcsin(1/n)$ is required. When $\vartheta c$ is equal to 41°, L=0.969 mm can be calculated by formula 2.

When the refractive index of the selected passing through medium is different, the total reflection angle will also be different, and the L value will also change accordingly. According to Snell's Law, the characteristics of light transmission between different media can be calculated, and the total reflection angle can be calculated as follows:

$$n_1 * \sin\vartheta_1 = n_2 * \sin\vartheta_2 \qquad (3)$$

where n1 and n2 are the refractive index of the outgoing medium and the refractive index of the incoming medium, $\vartheta 1$ and $\vartheta 2$ are the angle of the outgoing medium and the angle of the incoming medium. The refraction angle and the total reflection angle can be derived by formula 2. Then the total reflection angle $\vartheta c$ is:

$$\vartheta_c = \sin^{-1}(1/n_1) \qquad (4)$$

It can be understood that the smaller the refractive index difference between the transmission medium and the air, the smaller the total reflection angle.

It can be calculated from formula 2 that the larger the total reflection angle, the larger the diameter of the coupled light spot, and the light within the total reflection angle can be coupled out of the waveguide, which is more conducive to transmitting the mini-LED light out of the medium, thereby improving the utilization efficiency of the mini-LED light and increasing the brightness. At the same time, the larger the total reflection angle, the easier it is to make the pitch between mini-LEDs larger. Under the premise of equal brightness and uniformity, the number of mini-LEDs can be reduced.

The refractive index of air is 1. When a transparent substrate 111 with a refractive index of 1.40 is selected, the total reflection angle is 45.61°. By calculating from formula 2, it can be obtained that L is 1.12 mm. If a glass substrate is used, L can reach 1.53 mm. In other words, the lower the refractive index of the transparent substrate 111, the more it can reduce the number of mini-LEDs, which is more conducive to reducing power consumption and costs.

Figure 12:
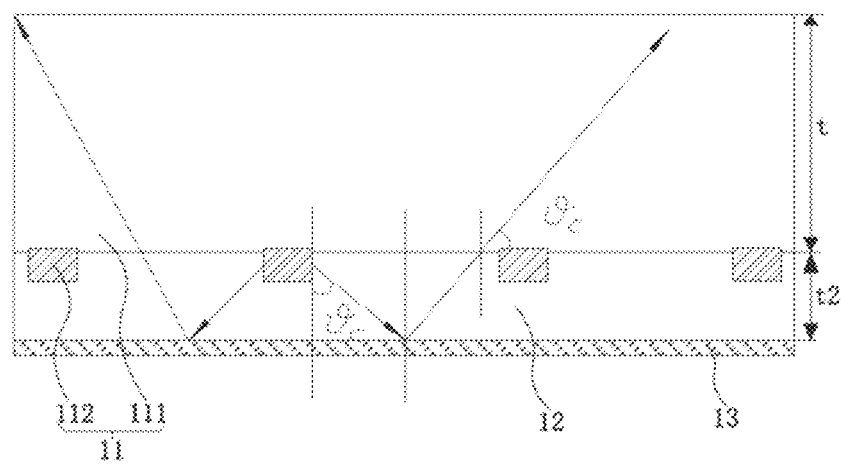
FIG. 12 is a schematic diagram of a structure of a backlight module involved in an embodiment of the present disclosure increasing the optical path by changing the light emission direction.

As shown in FIG. 12, the outgoing light of the mini-LED first passes through the encapsulation layer 12, and is reflected by the reflective layer, and then passes through the encapsulation layer 12, and then passes through the transparent substrate, and then emits light on the upper surface of the substrate. The thickness of the encapsulation and substrate is effectively utilized to increase the optical path and reduce the thickness of the backlight module. Considering that the MLED passes through the encapsulation layer 12 and the transparent substrate 111 twice, the minimum thickness below the substrate of the MLED backlight is 0.3×2+ 0.7=1.3 mm, Considering the Lambertian light source properties of the mini-LED, the optical length (OL) calculation formula is:

$$OL = 2 \times \frac{t_2}{\cos\vartheta_c} + \frac{t}{\sin\vartheta_c} \qquad (5)$$

If the refractive indices of the transmission media are all 1.5, the optical path is 0.795+1.067=1.862 mm. The thickness of 1.862 mm is close to the thickness of the air gap 18 in FIG. 1, which is 2 mm. Therefore, the backlight module in this embodiment can remove the thickness of the air gap 18.

Figure 13:
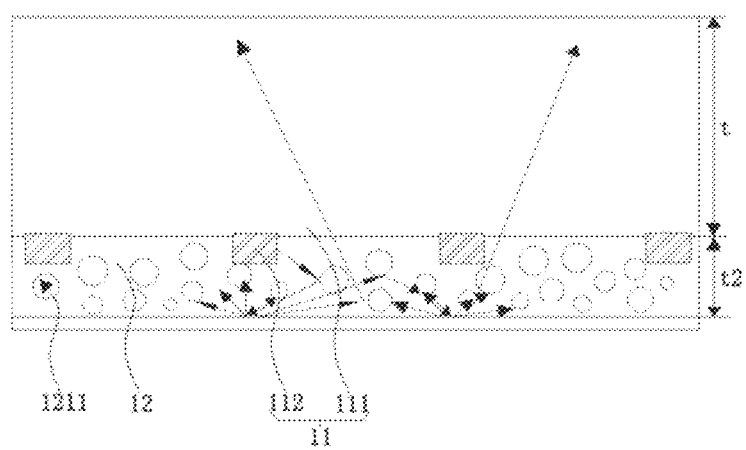
FIG. 13 is a schematic diagram of the structure of a backlight module involved in an embodiment of the present disclosure increasing the optical path by scattering.

As shown in FIG. 13, the side of the plurality of light-emitting units 112 away from the transparent substrate 111 is integrated with an encapsulation layer 12, and the encapsulation layer 12 is arranged on the surface of the light-emitting substrate 11 by means of a film. The encapsulation layer 12 wraps color conversion particles 1211 of at least one color. The color of the outgoing light of the light-emitting unit 112 changes after passing through the color conversion particles 1211.

Figure 14:
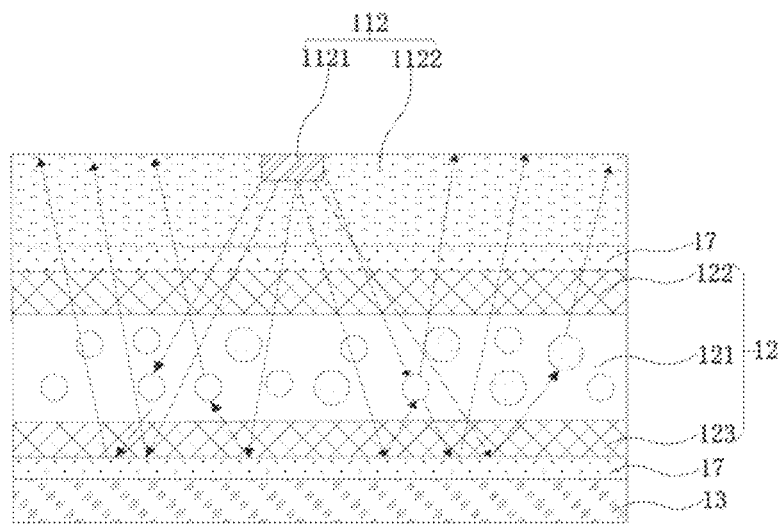
FIG. 14 is a schematic diagram of a structure of a color conversion layer involved in an embodiment of the present disclosure.

As shown in FIG. 14, the encapsulation layer 12 may include a plurality of sublayers, which are respectively a first barrier layer 122, a color conversion layer 121, and a second barrier layer 123. The first barrier layer 122 is provided on a side of the plurality of light-emitting units 112 away from the transparent substrate 111. The color conversion layer 121 is provided on a side of the first barrier layer 122 away from the transparent substrate 111. The second barrier layer 123 is provided on a side of the color conversion layer 121 away from the transparent substrate 111. The color conversion layer 121 contains a plurality of color conversion particles of different colors. The color conversion particles 1211 of different colors may include red color conversion particles and green color conversion particles.

It should be noted that the light-emitting unit 112 includes a lamp bead 1121 and a protective adhesive 1122. The protective adhesive 1122 covers a side of the lamp bead 1121 away from the transparent substrate 111, and can encapsulate the plurality of light-emitting units 112 as a whole surface. The first barrier layer 122 is connected to the protective adhesive 1122 through the adhesive layer 17, and the second barrier layer 123 is connected to the first reflective layer 13 through the adhesive layer 17.

As mentioned above, the light-emitting unit 112 is a mini-LED that emits blue light. The light-emitting unit 112 emits blue outgoing light. Part of the blue outgoing light passes through the red color conversion particles and the green color conversion particles, and is excited to be converted into red light and green light. Part of the blue outgoing light transmits through the spaces between the color conversion particles 1211. The outgoing light passes through the color conversion layer 121 to reach the first reflective layer 13. After being reflected by the first reflective layer 13, it passes through the color conversion layer 121 again. The reflected light does not encounter the color conversion particles 1211, and directly transmits through the color conversion layer 121. After encountering the red color conversion particles and the green color conversion particles, it is converted into green light or red light and transmits out of the encapsulation layer 12. The outgoing light passes through the color conversion layer at least twice, so the thickness of the color conversion layer 121 can be set smaller, so it can be integrated into the encapsulation layer 12.

Figure 15:
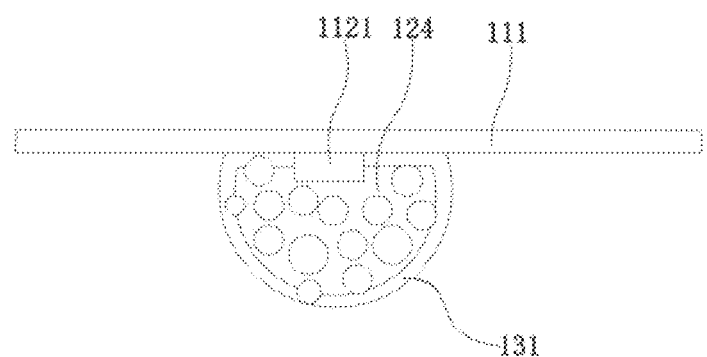
FIG. 15 is a schematic diagram of a structure of another color conversion layer involved in an embodiment of the present disclosure.

The light-emitting unit can also be encapsulated in a dispensing manner. As shown in FIG. 15, the packaging layer 12 includes a plurality of sub-parts 124. Each of the sub-parts 124 wraps a light-emitting unit 112, and each of the sub-parts 124 wraps a plurality of color conversion particles 1211 of different colors. The first reflective layer 13 includes a plurality of first reflective parts 131. Each of the first reflective parts 131 wraps a sub-part 124.

It should be noted that the material of the color conversion particle 1211 is nitride phosphor or fluoride phosphor. If it is fluoride phosphor, the color conversion particle 1211 will also bring a certain degree of scattering, and the requirement for the scattering degree of the first reflective layer 13 is slightly lower. If quantum dot material is used for color conversion, the scattering degree of the first reflective layer 13 is required to be higher, and the closer it is to Lambertian scattering, the uniformity requirement can be achieved.

A first reflective layer 13 is provided on the side of the encapsulation layer 12 away from the transparent substrate 111. When the roughness of the first reflective layer 13 is less than 1 micron, the light intensity is concentrated at the angle of mirror reflection, and there is appropriate scattering. When the roughness of the first reflective layer 13 is greater than 2 microns, the reflection of the first reflective layer 13 is close to Lambertian scattering, and the scattering intensity of the light intensity at each angle is not much different.

A model is established in the geometric optical design software to calculate the backlight transmittance and backlight uniformity of the backlight module in FIG. 1 as well as the backlight transmittance and backlight uniformity when the reflective layer of the backlight module in the embodiment of the present disclosure adopts mirror reflection and Lambertian scattering reflection respectively. If the backlight module in FIG. 1 is used, the backlight transmittance is 55.4% and the backlight uniformity is 97%. In the backlight module in the embodiment of the present disclosure, if mirror reflection is used, the backlight transmittance is 57.5% and the backlight uniformity is 91.1%. If Lambertian scattering reflection is used, the backlight transmittance is 57.5% and the backlight uniformity is 95%. Compared with the backlight module in FIG. 1, the backlight transmittance of Lambertian scattering reflection is increased by 2.1%, and the backlight uniformity can reach 95%, which meets the uniformity requirements of the display device.

In this embodiment, the side of the first reflective layer 13 close to the transparent substrate 111 is a rough surface. The roughness of the rough surface is greater than 2 microns to meet the conditions of Lambertian scattering. Specifically, the first reflective layer 13 can be a bubble reflector, and the first reflective layer 13 includes a plurality of bubbles and a protective film wrapped outside the plurality of bubbles. The diameter of the bubble is greater than 2 microns.

The color conversion layer 121 provides a first scattering, and the first reflective layer 13 provides a second scattering. The two scatterings increase the optical path and also act as a diffusor plate.

The encapsulation between the encapsulation layer 12 and the first reflective layer 13 is preferably a bubble-free encapsulation to reduce the optical loss caused by the refractive index difference. The above optical design requirements can be achieved by mechanical lamination and degassing. When the encapsulation layer 12 and the first reflective layer 13 are laminated, debubbling is performed at 30° C. for 10 minutes and the debubbling pressure is 3 kg. After debubbling and lamination, the first reflective layer 13 is then laminated to the encapsulation layer 12, and then debubbling is performed at the same temperature. The debubbling time is 15 minutes and the pressure is 3.5 kg. Then the area between the encapsulation layer 12 and the first reflective layer 13, located in the periphery of the light-emitting unit 112, is observed. This area is most likely to produce bubbles. There are no bubbles under an optical microscope, which basically guarantees the optical design requirements.

Figure 16:
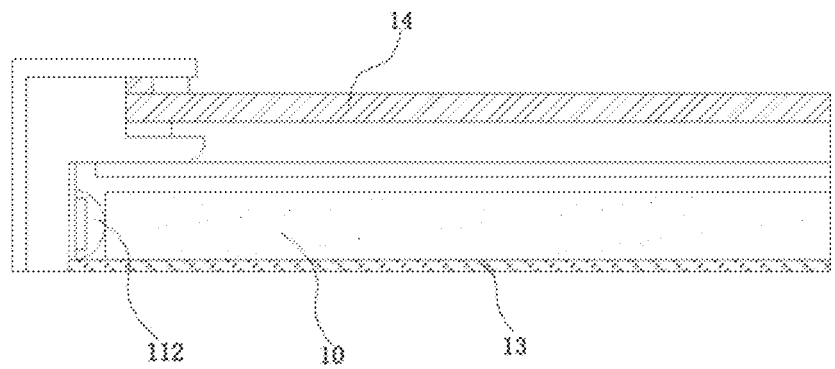
FIG. 16 is a schematic diagram of a structure of another backlight module involved in the related art.

A backlight module is shown in the related art. As shown in FIG. 16, a light-emitting unit 112 is provided on the side edge of a light guide plate 10 (Lighmm Guide Panel), and the outgoing light of the light-emitting unit 112 is introduced into the light guide plate 10 as a light-emitting substrate, and then the light is collected by a prism to achieve the backlight requirements of passive display. This side-entry backlight module is relatively thin, but it cannot meet the ultra-high contrast requirements of high-end display products.

Comparing the color gamut of the backlight module of the present disclosure with the color gamut of the backlight module in FIG. 16, the color gamut of the backlight module of the present disclosure can reach 106% NTSC (CIE1931), while the color gamut of the backlight module in FIG. 16 is 70% NTSC (CIE1931). In the color gamut coordinate system of CIE1976, the area of the triangular color gamut of the backlight module of the present disclosure is 47% higher than that of the triangular color gamut of the backlight module in FIG. 16, and is much larger than the NTSC standard color gamut and the SRGB standard color gamut.

Figure 17:
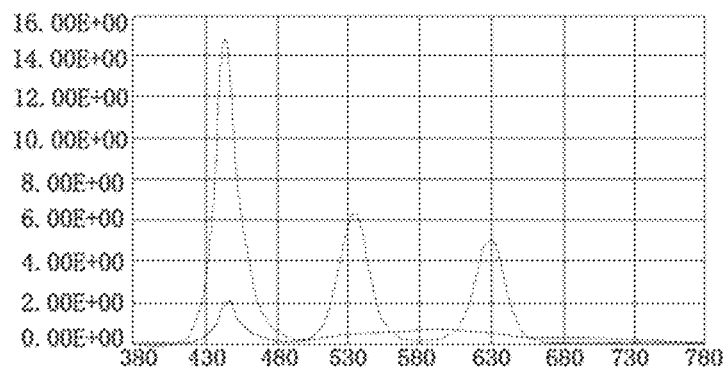
FIG. 17 is a schematic diagram of the comparison of the spectrum of a backlight module involved in an embodiment of the present disclosure and the spectrum of another backlight module in the related art.

As shown in FIG. 17, the spectrum of the backlight module of the present disclosure is also compared with the spectrum of the backlight module in FIG. 16, wherein the dotted line represents the spectrum of the backlight module of the present disclosure, and the solid line represents the spectrum of the backlight module in FIG. 16. Compared with the spectrum of the backlight module in FIG. 16, the spectrum of the backlight module of the present disclosure has narrower half-peak widths of R, G, and B, that is, higher color purity.

Obviously, the backlight module of the present disclosure is more in line with the requirements of high color gamut and high color purity of high-end display devices.

Figure 18:
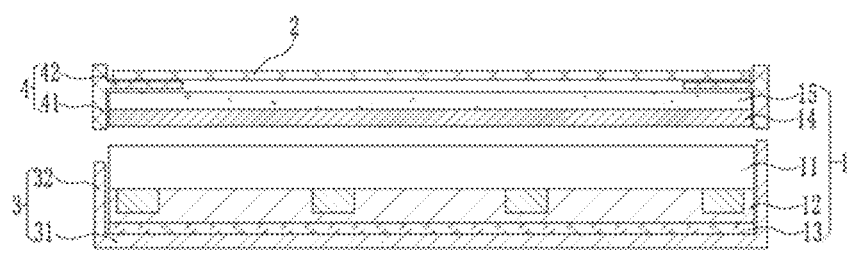
FIG. 18 is a schematic diagram of a structure of a display device involved in an embodiment of the present disclosure.

The present disclosure also provides a display device. As shown in FIG. 18, the display device includes a back plate 3, a frame 4, a backlight module 1 and a display panel 2, and the frame 2 is arranged in the back plate 1. The back plate 3 includes a bottom plate 31 and a plurality of side plates 32 fixedly connected to the bottom plate 31. The frame 4 includes a first support portion 41 and a plurality of second support portions 42 connected to the first support portion 41. The first support portion 41 is parallel to the bottom plate 31, and the second support portion 42 is parallel to the side plate 32. The orthographic projection of the first support portion 41 on the bottom plate 31 is located at the edge of the bottom plate 31. The backlight module 1 is arranged between the bottom plate 31 and the first support portion 41. The display panel is arranged on a side of the first support portion 21 away from the bottom plate 11.

The display device can also refer to the specific structure and beneficial effects of the backlight module, which will not be repeated here.

Figure 19:
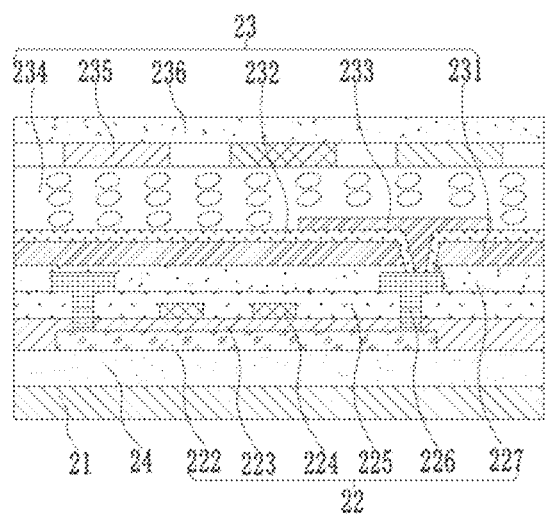
FIG. 19 is a schematic diagram of a structure of a display panel involved in an embodiment of the present disclosure.

The display panel of the present disclosure is described in detail below. As shown in FIG. 19, the display panel may include a substrate 21, a driving circuit layer 22 and a pixel layer 23 which are stacked in sequence. A second buffer layer 24 is provided on one side of the substrate 21. The driving circuit layer 22 is provided on the side of the second buffer layer 24 away from the substrate 21. The pixel layer 23 is provided on the side of the driving circuit layer 22 away from the substrate 21.

The substrate 21 may be a substrate 21 of an inorganic material, or may be a substrate 21 of an organic material. For example, in one embodiment of the present disclosure, the material of the substrate 21 may be a glass material such as soda-lime glass, quartz glass, sapphire glass, or may be a metal material such as stainless steel, aluminum, nickel, etc.

In another embodiment of the present disclosure, the material of the substrate 21 may be polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN) or a combination thereof.

In another embodiment of the present disclosure, the substrate 21 may also be a flexible substrate 21. For example, the material of the substrate 21 may be polyimide (PI). The substrate 21 may also be a composite of multiple layers of materials. For example, in one embodiment of the present disclosure, the substrate 21 may include a bottom film layer, a pressure-sensitive adhesive layer, a first polyimide layer, and a second polyimide layer stacked in sequence.

The driving circuit layer includes a plurality of driving circuit areas. Any driving circuit area may include a transistor and a storage capacitor. The transistor may be a thin film transistor, and the thin film transistor may be selected from a top-gate thin film transistor, a bottom-gate thin film transistor, or a double-gate thin film transistor.

The material of the active layer of the thin film transistor may be an amorphous silicon semiconductor material, a low-temperature polycrystalline silicon semiconductor material, a metal oxide semiconductor material, an organic semiconductor material, or other types of semiconductor materials. The thin film transistor may be an N-type thin film transistor or a P-type thin film transistor.

The transistor may have a first terminal, a second terminal, and a control terminal. One of the first terminal and the second terminal may be the source of the transistor and the other may be the drain of the transistor, and the control terminal may be the gate of the transistor. It can be understood that the source and drain of the transistor are two relative and mutually convertible concepts. When the operating state of the transistor changes, for example, when the current direction changes, the source and drain of the transistor may be interchangeable.

In the present disclosure, the driving circuit layer 22 may include a transistor layer, an interlayer dielectric layer 225 and a source-drain metal layer 226 sequentially stacked on the substrate 21. The transistor layer is provided with an active layer and a gate of the transistor, and the source-drain metal layer 226 is electrically connected to the source and drain of the transistor. Optionally, the transistor layer may include an active layer 222, a gate insulating layer 223 and a gate layer 224 stacked between the substrate 21 and the interlayer dielectric layer 225. The positional relationship of each film layer may be determined according to the film layer structure of the thin film transistor.

In some embodiments, the active layer 222 may be configured to form an active layer of a transistor. The active layer of the semiconductor includes a channel region and a source and a drain located on both sides of the channel region. The channel region may maintain semiconductor characteristics, and the semiconductor material of the source and the drain is partially or completely conductive. The gate layer 224 may be configured to form gate layer wiring such as a scanning line, may also be configured to form a gate of a transistor, and may also be configured to form part or all of the electrode plates of a storage capacitor. The source-drain metal layer 226 can be configured to form source-drain metal layer wiring such as data line and power line.

Taking the top-gate thin film transistor as an example, in some embodiments of the present disclosure, the driving circuit layer 22 may include an active layer 222, a gate insulating layer 223, a gate layer 224, an interlayer dielectric layer 225 and a source-drain metal layer 226 stacked in sequence.

The driving circuit layer 22 may also include a planarization layer 227. The planarization layer 227 may be provided as one or more layers according to different situations. The planarization layer 227 may be provided on the side of the source-drain metal layer 226 of the driving transistor away from the substrate 21, and the surface of the planarization layer 227 away from the substrate 21 is a plane. The planarization layer 227 is provided with a plurality of first vias exposing the source-drain metal layer 226 of the driving transistor at intervals.

A pixel layer 23 may be provided on the side of the planarization layer 227 away from the substrate 21. The pixel layer 23 includes a common electrode 231. The common electrode 231 is provided with a plurality of second vias at intervals. The orthographic projection of the second vias on the substrate 21 is located within the orthographic projection of the first vias on the substrate 21.

A second protective layer 232 is provided on the side of the common electrode 231 away from the substrate 21. The second protective layer 232 covers the side of the common electrode 231 away from the substrate 21. The second protective layer 232 extends from the portion of the common electrode 231 provided with the second via and the portion of the planarization layer 227 provided with the first via to the source-drain metal layer 226 of the driving transistor. The second protective layer 232 partially covers the source-drain metal layer 226 of the driving transistor at one end close to the substrate 21, forming an opening that exposes a portion of the source-drain metal layer 226 of the driving transistor. A plurality of pixel electrodes 233 are provided on the side of the second protective layer 232 away from the substrate 21. The pixel electrode 233 is provided in the opening and connected to the source-drain metal layer 226 of the driving transistor.

A liquid crystal layer 234 is provided on the side of the pixel electrode 233 away from the source-drain metal layer 226 of the driving transistor. The liquid crystal layer 234 covers the second protective layer 232 and the source-drain metal layer 226 of the driving transistor. Since the second protective layer 232 is provided between the pixel electrode 233 and the common electrode 231, and both the pixel electrode 233 and the common electrode 231 have a driving surface, it can be considered that the liquid crystal layer 234 is located between the pixel electrode 233 and the common electrode 231. A color filter layer 235 is provided on the side of the liquid crystal layer 234 away from the substrate, and an insulating layer 236 can be provided on the side of the color filter layer 235 away from the substrate 21.

The display device can be a traditional electronic device, such as a mobile phone, a computer, a television, and a camcorder, or it can be an emerging wearable device, such as a virtual reality device and an augmented reality device, which are not listed here one by one. A large-size display device usually includes multiple light-emitting substrates spliced together. An encapsulation layer can be set on the light-emitting side of the multiple light-emitting substrates, and the encapsulation layer covers the light-emitting sides of all the light-emitting substrates. The first reflective layer is provided on the side of the encapsulation layer away from the light-emitting substrate. The orthographic projection of the first reflective layer on the transparent substrate can coincide with the orthographic projection of the encapsulation layer on the transparent substrate. In other implementations, multiple backlight modules can also be directly spliced together according to the size of the display device to form a large backlight source.

It should be noted that in addition to the backlight module and the display panel, the display device also includes other necessary components and parts. Taking a mobile phone as an example, such as a housing, a circuit board, etc., those skilled in the art can make corresponding supplements according to the specific use requirements of the display device, which will not be repeated here.

After considering the specification and practicing the disclosure herein, those skilled in the art will easily think of other embodiments of the present disclosure. This application is intended to cover any variants, uses or adaptive changes of the present disclosure, which follow the general principles of the present disclosure and include common knowledge or conventional technical means in the technical field that are not disclosed in the present disclosure. It is intended that the specification and examples be considered as exemplary only, with a true scope and spirit of the disclosure being indicated by the following claims.

What is claimed is:

1. A backlight module, comprising:
a light-emitting substrate, comprising a transparent substrate and a plurality of light-emitting units, wherein the plurality of light-emitting units are arranged in an array on a side of the transparent substrate;
an encapsulation layer, disposed on a side of the plurality of light-emitting units away from the transparent substrate, wherein an orthographic projection of the encapsulation layer on the transparent substrate at least covers an orthographic projection of the plurality of light-emitting units on the transparent substrate; and
a first reflective layer, disposed on a side of the encapsulation layer away from the transparent substrate, wherein an orthographic projection of the first reflective layer on the transparent substrate at least covers the orthographic projection of the plurality of light-emitting units on the transparent substrate, and wherein the first reflective layer is a Lambertian body,
wherein the encapsulation layer wraps a color conversion particle of at least one color,
wherein the backlight module further comprises a first driving layer group, and the first driving layer group comprises:
a first conductive layer, disposed on a same side of the transparent substrate as the light-emitting units, and the first conductive layer comprises a plurality of first wirings;
a first insulating layer, disposed on a side of the first conductive layer away from the transparent substrate and is located between two adjacent first wirings, and the first insulating layer is provided with a first opening for exposing the first conductive layer;
a second conductive layer, disposed on a side of the first insulating layer away from the transparent substrate, the second conductive layer comprises a plurality of second wirings, the second wirings pass through the first opening and are connected to the first wirings and are connected to the light-emitting units; and
a second insulating layer, disposed on a side of the second conductive layer away from the transparent substrate and is located between two adjacent second wirings,
wherein a portion of the first insulating layer located between two adjacent first wirings is provided with a second opening, and/or a portion of the second insulating layer located between two adjacent second wirings is provided with a third opening.

2. The backlight module according to claim 1, wherein a side of the first reflective layer close to the transparent substrate is a rough surface, and a roughness of the rough surface is greater than 2 microns.

3. The backlight module according to claim 2, wherein the first reflective layer is a bubble reflector, wherein the first reflective layer comprises a plurality of bubbles and a protective film wrapped around the plurality of bubbles, and diameters of the bubbles are greater than 2 microns.

4. The backlight module according to claim 1, wherein the encapsulation layer comprises a plurality of sub-layers, the plurality of sub-layers are respectively a first barrier layer, a color conversion layer and a second barrier layer, the first barrier layer is arranged on a side of the plurality of light-emitting units away from the transparent substrate, the color conversion layer is arranged on a side of the first barrier layer away from the transparent substrate, the second barrier layer is arranged on a side of the color conversion layer away from the transparent substrate, and the color conversion layer contains a color conversion particle of at least one color.

5. The backlight module according to claim 1, wherein the encapsulation layer comprises a plurality of sub-parts, each of the sub-parts wraps one of the light-emitting units, and each of the sub-parts wraps a color conversion particle of at least one color.

6. The backlight module according to claim 5, wherein the first reflective layer comprises a plurality of first reflective parts, and each of the first reflective parts wraps one of the sub-parts.

7. The backlight module according to claim 1, wherein a material of the color conversion particle is nitride phosphor or fluoride phosphor.

8. The backlight module according to claim 1, wherein the first driving layer group further comprises a second reflective layer, the second reflective layer is arranged between the second conductive layer and the second insulating layer, an orthographic projection of the second reflective layer on the transparent substrate overlaps at least partially with an orthographic projection of the first wirings on the transparent substrate, and an orthographic projection of the second reflective layer on the transparent substrate overlaps at least partially with an orthographic projection of the second wirings on the transparent substrate.

9. The backlight module according to claim 1, wherein the first insulating layer and the second insulating layer are both optical adhesives, and a transmittance of the optical adhesive to an outgoing light of the light-emitting unit is greater than 95%.

10. The backlight module according to claim 1, wherein the first driving layer group further comprises a third reflective layer, the third reflective layer is disposed between the transparent substrate and the first conductive layer, an orthographic projection of the third reflective layer on the transparent substrate covers an orthographic projection of the first wirings on the transparent substrate, and an orthographic projection of the third reflective layer on the transparent substrate covers an orthographic projection of the second wirings on the transparent substrate.

11. The backlight module according to claim 1, wherein the first wirings and the second wirings are reflective parts, a portion of the first insulating layer located between the first wirings and a portion of the second insulating layer located between the second wirings are transparent parts, and an orthographic projection area of the transparent part on the transparent substrate accounts for more than 87% of an orthographic projection of the first driving layer group on the transparent substrate.

12. The backlight module according to claim 11, wherein the backlight module comprises a plurality of light-emitting areas, and in different light-emitting areas, a pitch differs between two adjacent first wirings, and a pitch differs between two adjacent second wirings.

13. The backlight module according to claim 1, wherein the plurality of light-emitting units are arranged into a plurality of mutually interlaced equilateral triangle light-emitting groups, each of the equilateral triangle light-emitting groups comprises three light-emitting units, the three light-emitting units are respectively arranged at three vertices of the equilateral triangle light-emitting group, and two adjacent equilateral triangle light-emitting groups share two light-emitting units.

14. The backlight module according to claim 1, wherein the backlight module further comprises:
a polarizing layer, arranged on another side of the transparent substrate away from the light-emitting unit;
a diffusion layer, arranged on a side of the polarizing layer away from the transparent substrate.

15. A display device, comprising the backlight module according to claim 1.

* * * * *